United States Patent [19]
Hehl

[11] Patent Number: 4,995,801
[45] Date of Patent: Feb. 26, 1991

[54] INJECTION MOLDING MACHINE PROVIDED WITH A CONVEYOR FOR DELIVERING MOLDING FROM THE MACHINE

[76] Inventor: Karl Hehl, Arthur-Hehl-Str. 32, D-7298 Lossburg, Fed. Rep. of Germany

[21] Appl. No.: 382,730

[22] Filed: Jul. 19, 1989

[30] Foreign Application Priority Data

Aug. 18, 1988 [DE] Fed. Rep. of Germany ....... 3827987

[51] Int. Cl.$^5$ ............................................. B29C 45/84
[52] U.S. Cl. ................................. 425/151; 198/851; 198/853; 198/950; 264/334; 425/190; 425/192 R; 425/317; 425/436 R; 425/556
[58] Field of Search ............... 198/849, 851, 853, 950; 425/315, 403.1, 554, 556, 436 R, 431 RM, 317, 151, 182, 190, 192 R; 264/334

[56] References Cited

U.S. PATENT DOCUMENTS

| 4,155,444 | 5/1979 | Kovats | 198/853 |
| 4,564,348 | 1/1986 | Hehl | 198/950 |
| 4,608,008 | 8/1986 | Hehl | 425/542 |
| 4,882,901 | 11/1989 | Lapeyre | 198/853 |

FOREIGN PATENT DOCUMENTS

| 3934978 | 3/1980 | Australia . |
| 0054394 | 8/1985 | European Pat. Off. . |
| 7435801 | 2/1975 | Fed. Rep. of Germany . |
| 2264865 | 5/1978 | Fed. Rep. of Germany . |
| 2300202 | 1/1983 | Fed. Rep. of Germany . |
| 3241632 | 9/1986 | Fed. Rep. of Germany . |
| 3238185 | 11/1987 | Fed. Rep. of Germany . |

Primary Examiner—Timothy Heitbrink
Attorney, Agent, or Firm—Spensley Horn Jubas & Lubitz

[57] ABSTRACT

A conveyor having an endless conveying belt, which includes a series of slats, which in the upper course of the belt constitute a conveying surface. The slats include sheet metal blanks and are supported on link chains. The slats are adapted to be manually removed from and to be inserted into the conveying belt. The link chains extend along opposite edges of the conveyor belt and mesh with chain sprockets, which constitute reversing pulleys. The design permits a rational series production and permits the use of the conveyor even for a delivery of very hot moldings made of plastics which have aggressive and/or abrasive properties. When slats or chain links have become soiled to such an extent that the function of the conveyor may adversely be affected or when defects have occurred, such parts can be replaced with a low expenditure of work and with a simple manipulation.

17 Claims, 9 Drawing Sheets

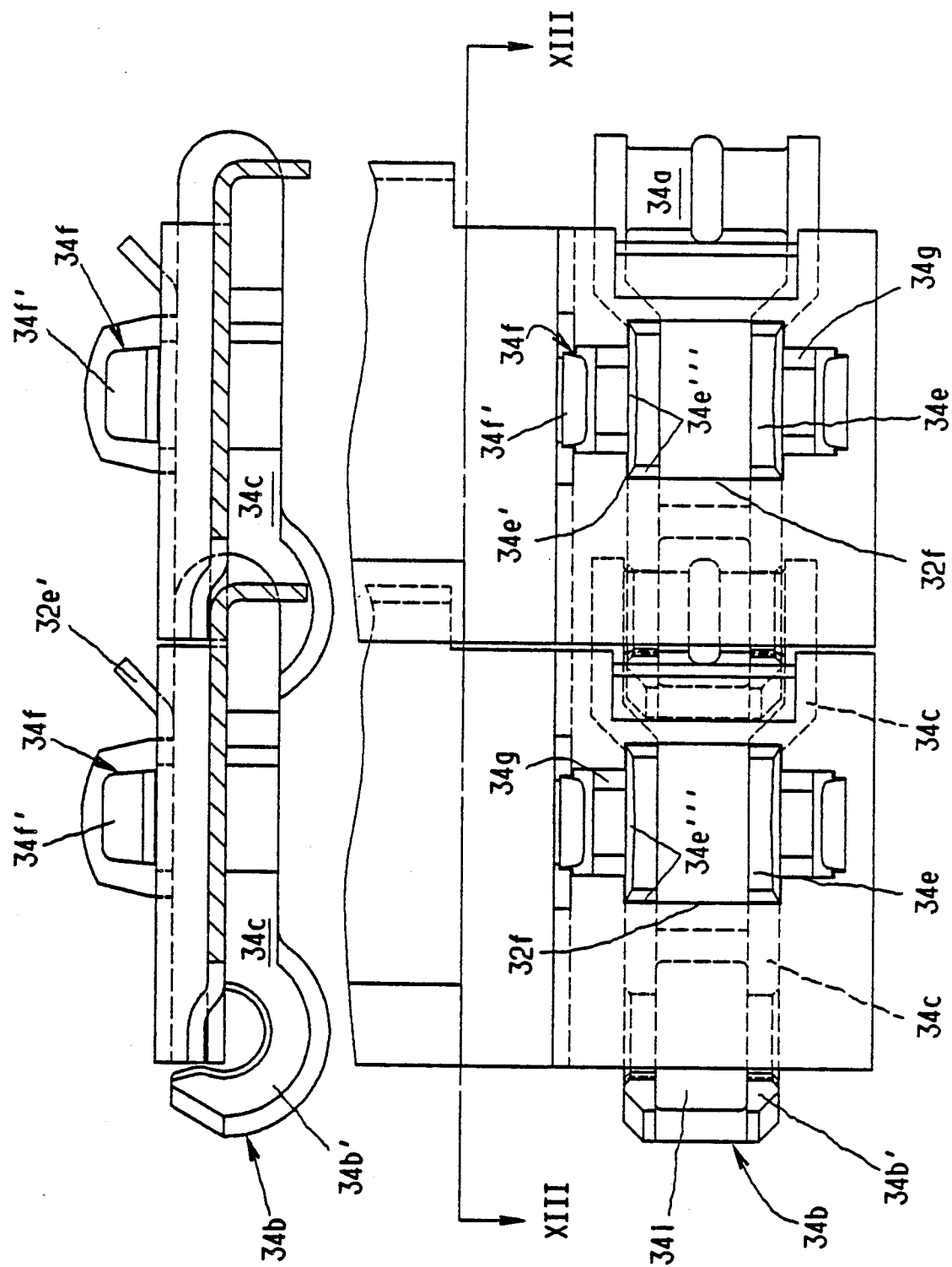

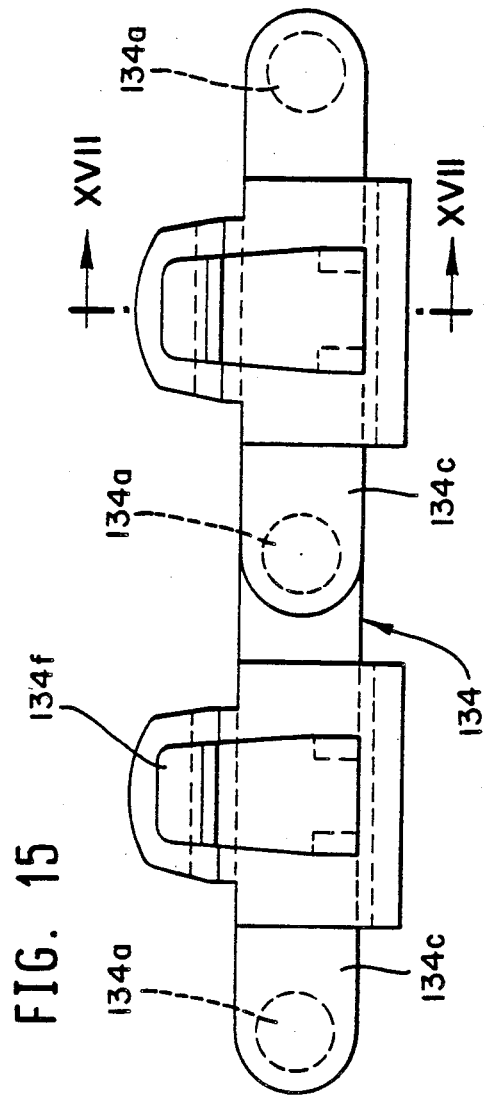
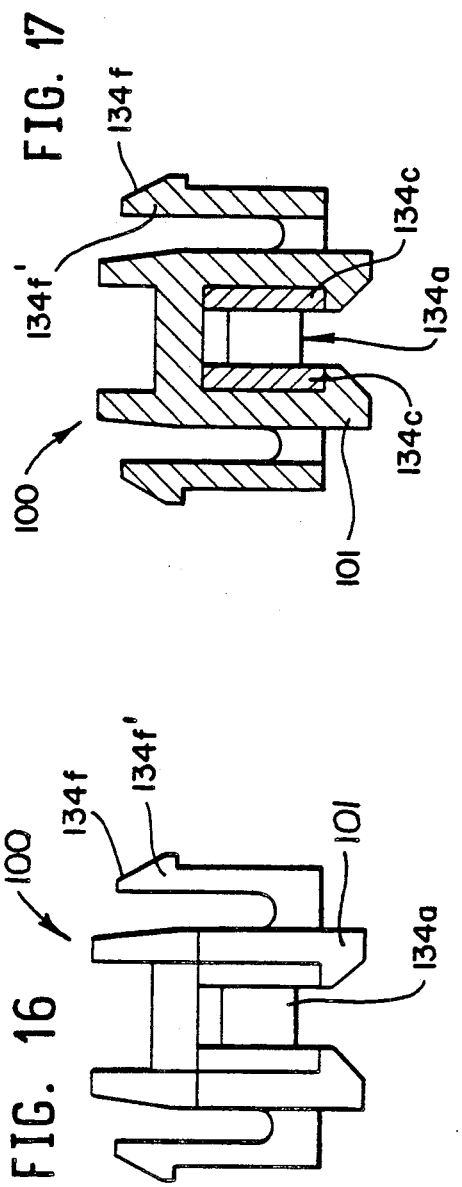

INJECTION MOLDING MACHINE PROVIDED WITH A CONVEYOR FOR DELIVERING MOLDING FROM THE MACHINE

BACKGROUND OF THE INVENTION

1. Field of the Invention

This invention relates to an injection molding machine which is provided with a conveyor for delivering out of the machine pedestal the moldings which in step with the cycles of operation of the machine have fallen out of the injection mold. The conveyor comprises an endless conveying belt, which is trained around reversing pulleys, at least one of which is motor driven. That conveying belt has a conveying surface that extends within the machine pedestal and coincides at least in part with the vertical projection of the injection mold.

2. Description of the Prior Art

Conveyors of the kind described first hereinbefore have been disclosed in DE No. 32 38 185 C3 and the corresponding U.S. Pat. No. 4,564,348 and in DE No. 34 08 459 C2 and the corresponding U.S. Pat. No. 4,608,008. In said known conveyors the conveying belts are made of fabric-reinforced flexible webs of latex or synthetic rubber and are trained around reversing pulleys of the conveyor. As a result, the conveying surface is constituted, as a rule, by a high-polymer material, which has a relatively low stability at elevated temperatures. During injection molding operations that conveying surface is often subjected to high mechanical and thermal stresses. This will mainly be the case if the injection moldings to be delivered are at a relatively high temperature as they fall out of the injection mold. The conveying belt will also be highly loaded, e.g., when hot plastic material which has abrasive and/or corrosive properties drips from the injection mold onto the conveying surface.

It is known per se to provide conveying belts composed of plastic elements which can articulatedly be clipped to each other (see, e.g., German Utility Model No. 74 35 801; DE No. 23 00 202 C2; EP No. 0 054 394 B1) or to provide conveying belts which consist of metallic slat belt (see, e.g., German Patent Publication No. 22 64 865) or to provide conveyor belts which are composed of metal and plastic elements, which are replaceable for special applications (DE No. 32 41 632 C2; AU-A1 39,349/78).

SUMMARY OF THE INVENTION

It is an object of the invention so to improve an injection molding machine which is of the kind described first hereinbefore that the conveyor can rationally be manufactured in series and that it will withstand for a long time the impact and contact with relatively hot moldings made of plastics which have aggressive and/or abrasive properties. It is also desired that individual components of the conveyor can be replaced with a small expenditure of work and by a simple manipulation in case of a disturbing or function-affecting soiling of such parts.

That object is accomplished in that the conveying belt consists of a chain belt and has a conveying surface that is constituted by a series of slats which consist of sheet metal blanks and are supported on the chain links of link chains at points which are approximately symmetrical to the vertical longitudinal plane of symmetry of the conveying belt, said slats are adapted to be manually removed from and inserted into the chain belt, and said link chains mesh with sprocket portions of said reversing pulleys.

That design provides particularly favorable conditions for a rational series production because the conveyor can be assembled from standardized components. The slats, which are connected to identical plastic moldings, can manually be inserted into and removed from the conveying belt. Owing to its high thermal conductivity the metallic conveying surface ensures an extremely fast heat exchange between the moldings and the atmosphere over the conveying surface.

Further improvements reside in that the slats are detachably connected in the chain belt by means of identical plastic elements, which are integrally formed with centering projections and resilient detent tongues and which constitute the chain links, which can manually be separated from each other, each chain link may comprise at one end a pivot pin, which is adjoined by link plates, and each chain link comprises at its other end a pin-mounting, which is adapted to receive and interlock with the pivot pin of the adjacent chain link. The pin-mounting portion may be constituted by semicircular link plate portions, which are formed with semicircular swivel bearings and are interconnected by a semicircular cross-piece, which is adapted to interengage with the sprocket portions. At least one centering projection of each chain link may extend through an aperture that is formed in an adjacent slat and may be provided with guiding surfaces adapted to slidably engage the slat and with centering surfaces, which are at right angles to each other and in contact with engaging edges of the associated slat. Each chain link may be formed with detent tongues, which are adapted to be clipped to the adjacent slat and extend through the aperture of the slat and have latching portions interengaging with the slat, and each detent tongue is provided at its root with crosspieces, which are integral with the adjacent link plate of the chain link. The slats may have offset end portions, which cover the chain links, and each of said end portions may contact a restraining ring of the pivot pin of the adjacent chain link.

BRIEF DESCRIPTION OF THE DRAWINGS

FIG. 13 is a sectional view taken on line XIII—XIII in FIG. 14.

FIG. 14 is an enlarged fragmentary top plan view showing a portion of the conveying belt of the conveyor.

FIGS. 15, 16 and 17 are, respectively, a side elevation, elevation and cross-section view showing chain links having detachable plastic connectors attached thereto.

DETAILED DESCRIPTION OF THE PREFERRED EMBODIMENT

Figure 1:
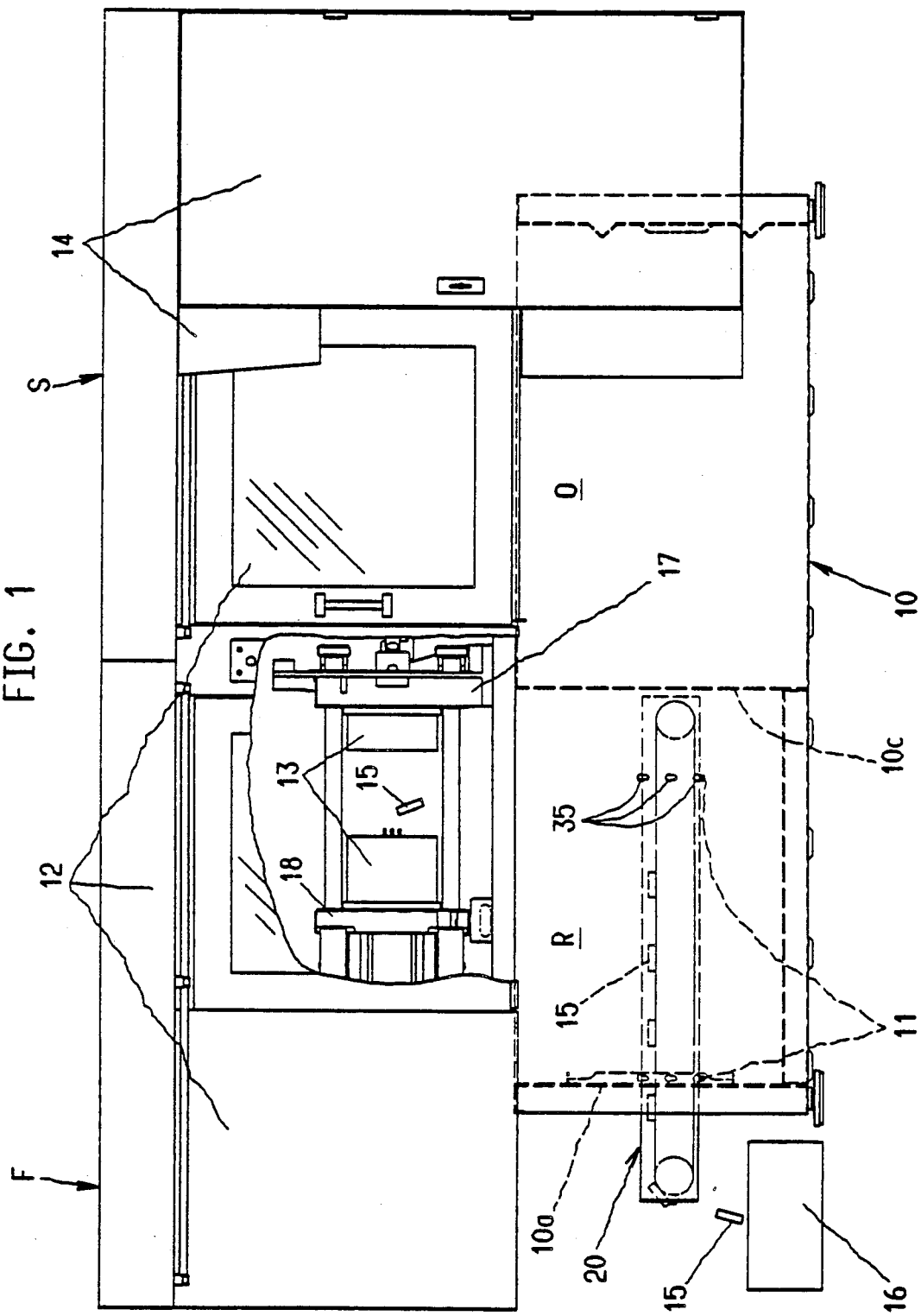
FIG. 1 is a side elevation showing a conveyor which extends into the delivery compartment of the pedestal of an injection molding machine.

An illustrative embodiment of the invention will now be explained more in detail with reference to the drawing.

It is apparent from FIG. 1 that a parallel-epipedic pedestal 10 of a conventional injection molding machine carries a horizontally movable clamping unit F and an injecting unit S. The units F and S are adapted to be shielded by respective covers 12. A control cabinet 14 containing the electronic control means for controlling the injection molding machine is mounted on said pedestal 10 adjacent to the injecting unit S. The sections of the injection mold 13 are mounted on mold carriers 17 and 18 of the clamping unit. The interior of the pedestal 10 is divided by a transverse partition 10c into a delivery compartment R adjacent to the clamping unit and an oil compartment O adjacent to the injecting unit. A conveyor 20 is supported on bars 11 in the delivery compartment. The bars 11 are adapted to be supported in the longitudinal side walls of the pedestal 10 on various levels and rest on the bottom edges of punched apertures 35 formed in said longitudinal side walls. The conveying surface of the conveyor 20 coincides at least in part with the vertical projection of the injection mold 13. The moldings 15 fall out of the open injection mold 13 onto the conveying surface of the conveyor 20 in step with the cycles of operation of the machine and on said conveying surface are delivered through an exit opening 10a formed in the adjacent end wall of the pedestal 10 and are then dropped from said conveying surface into a collecting container 16.

Figure 2:
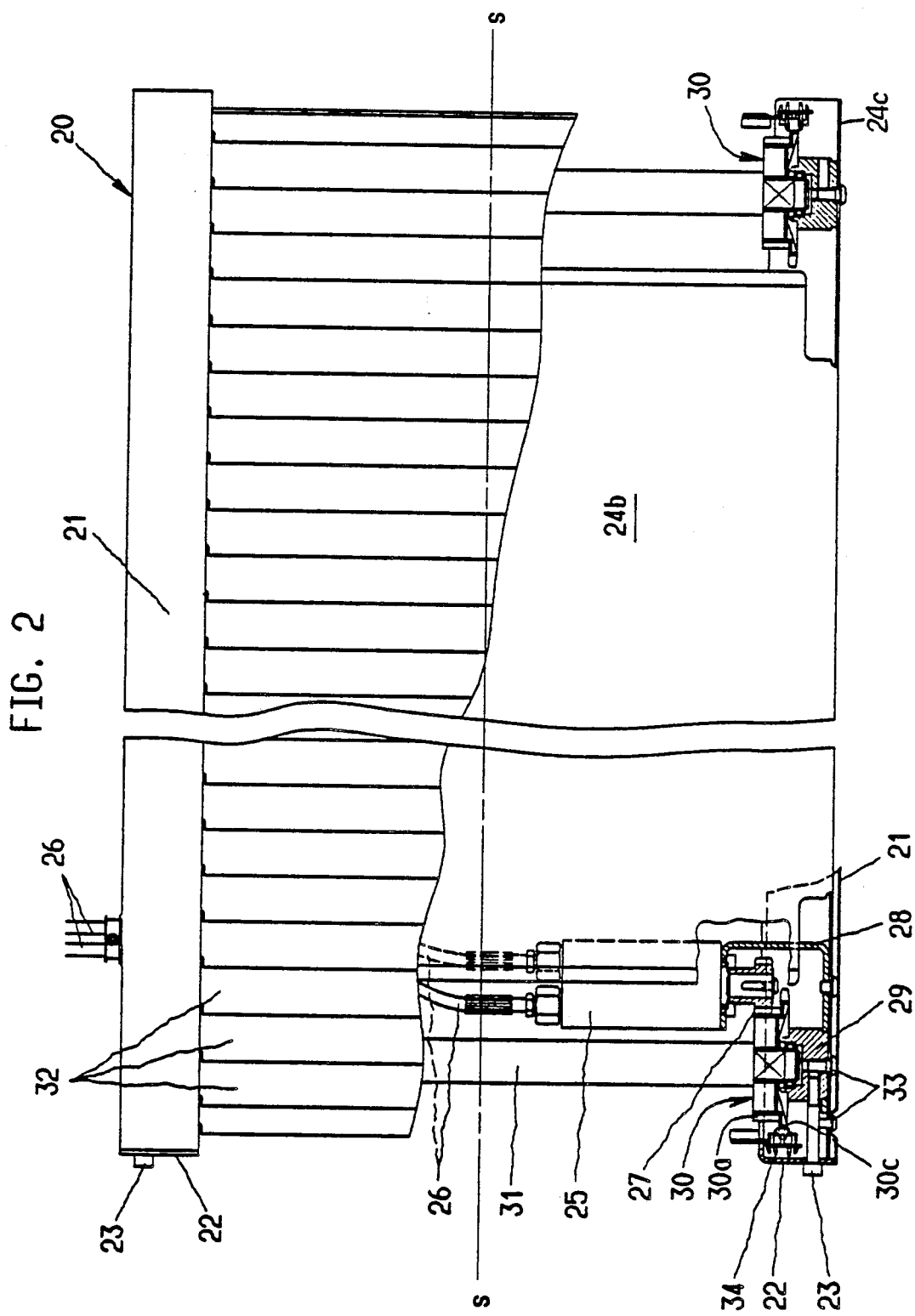
FIGS. 2 and 3, respectively, are a top plan view and an end elevation showing on a larger scale the conveyor of FIG. 1, partly cut away.
Figure 9:
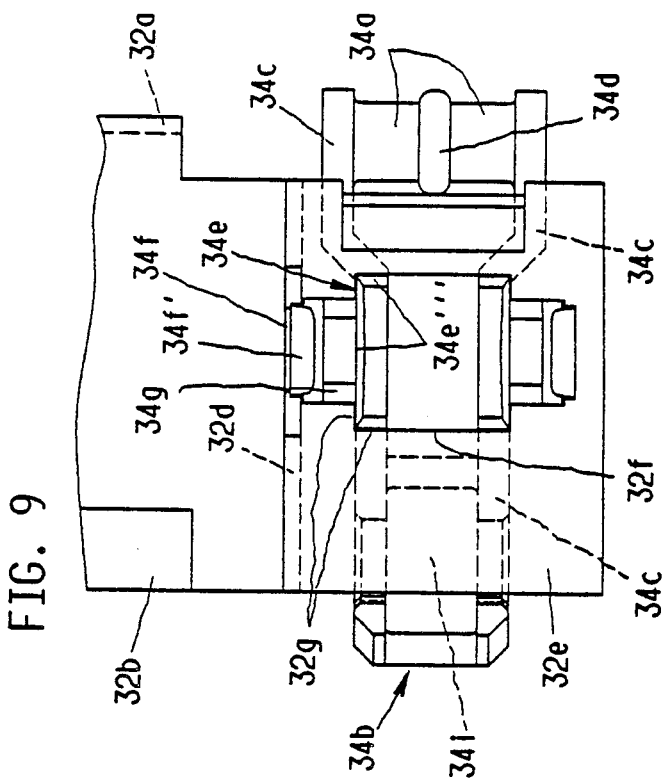
Figure 8:
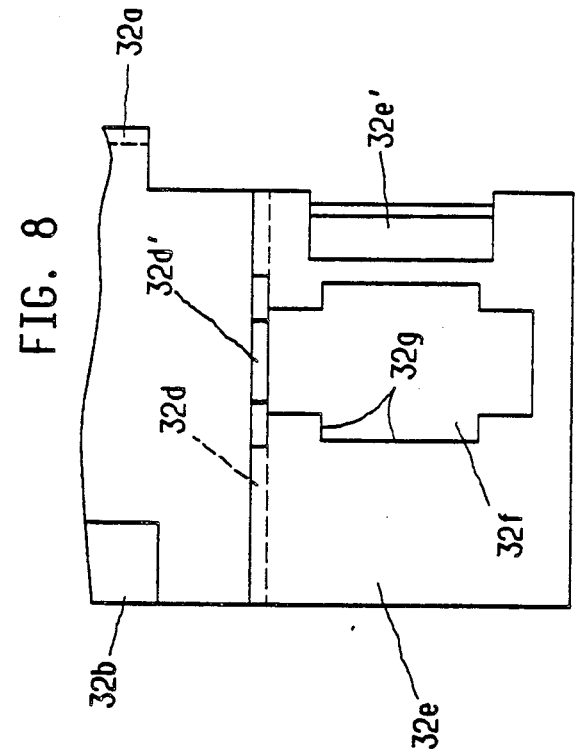
FIG. 8 is a top plan view showing the slat.
Figure 11:
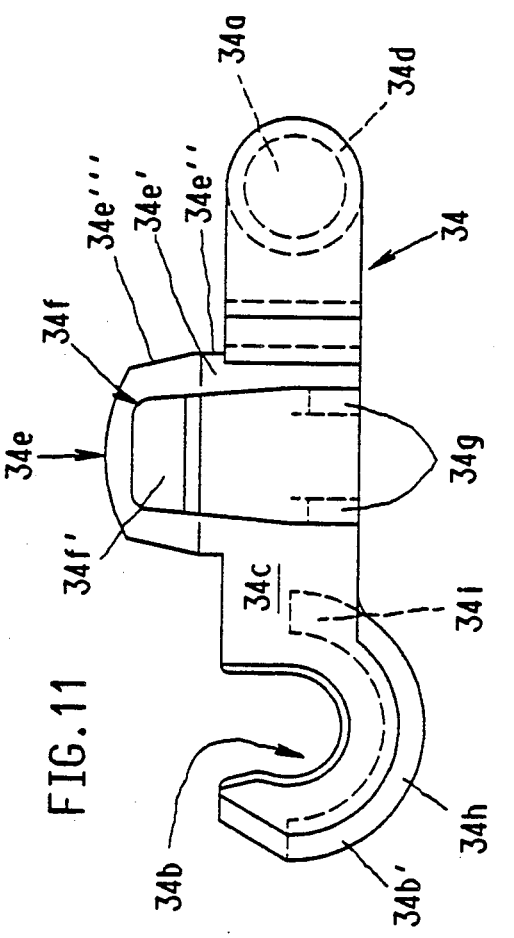
FIGS. 10, 11 and 12 are, respectively, an end elevation, side elevation and top plan view showing the chain link of FIGS. 6, 7 and 9 without a slat.
Figure 10:
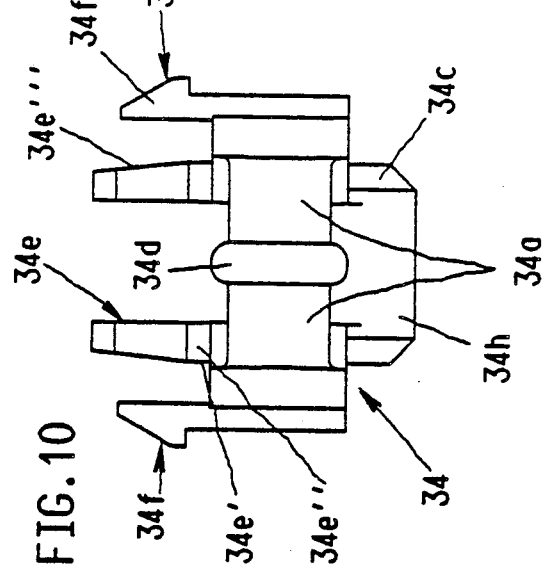
Figure 12:
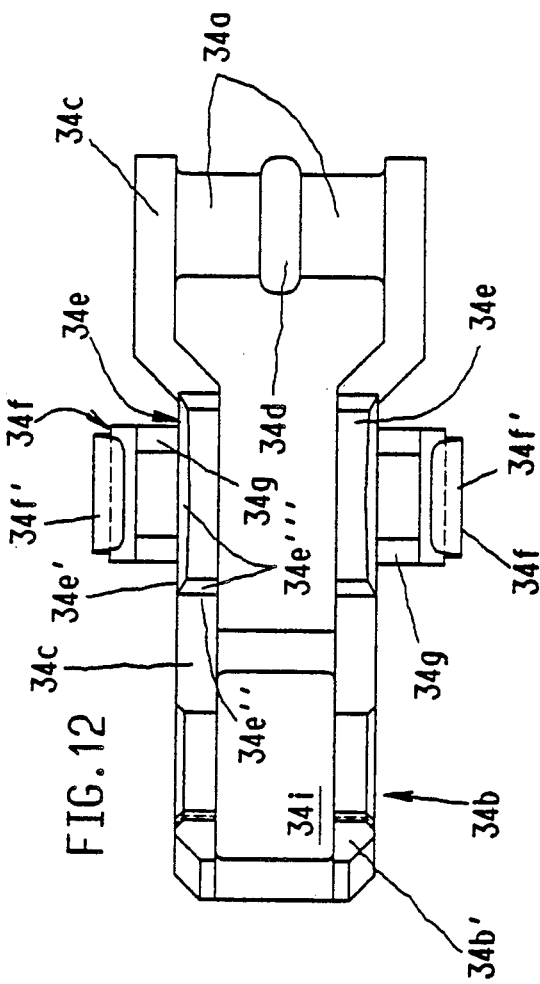

In the illustrative embodiment shown the conveying surface of the conveyor 20 is constituted by a conveying belt, which consists of a chain belt and is trained around chain sprockets 30, which are motor-driven. The conveying surface is specifically constituted by a series of slats 32 consisting each of a sheet metal blank, which is supported on two link chains G at locations which are at least approximately symmetrical to the vertical longitudinal plane of symmetry s—s (FIG. 2) of the conveying belt. The link chains G mesh with the chain sprockets 30. As is particularly apparent from FIGS. 6, 7 and 9 and 13 and 14, an injection-molded plastic chain link 34 of one of the chains G is positively and detachably connected to each slat at each end of the latter. Just as in a link chain of metal, such as a plate link chain, each of the identical chain links 34 consists of two parallel link plates 34c and a pivot pin 34a, which is disposed at one end of the chain link 34 and is adjoined at both ends by the end portions of the link plates 34c, which are formed with flanges adjacent to the pivot pin. At its other end the chain link 34 is formed with a pin-mounting portion 34b, which is adapted to radially receive and interengage with the pivot pin 34a of an adjacent chain link 34. The pin-mounting portion 34b comprises semicircular swivel bearings, which are constituted by substantially semicircular edge portions of end portions 34b' of the link plates. The end portions 34b' of the link plates 34c of each chain link 34 are interconnected by a crosspiece 34i, which is semicircular in cross-section and which together with the end portions 34b' of the link plates 34c constitutes a portion 34h for interengaging with the chain sprocket. The swivel bearings extend around an arc that is slightly in excess of 180° and the diameter of the pivot pin 34a is so matched to the radius of the swivel bearings formed by the link plate end portions 34b' that the pivot pin 34a of each chain link can be forced into the swivel bearings of the adjacent chain link 34 if a slight frictional resistance is overcome. As a result, the chain links 34 are joined by snap-action joints to form the link chain and can be separated from each other also by a snap action if the adjacent chain links are moved relative to each other transversely to the longitudinal direction of the link chain. Each slat 32 can be connected to the associated chain links 34 by snap-action joints. For this purpose each chain link 34 is integrally formed with two centering projections 34e, which have guiding surfaces 34e''' and are adapted to be inserted into an associated aperture 32f of the associated slat 32 while the sliding surfaces 34e''' are guided on the edges of said aperture 32f. Each centering projection 34e is formed with centering surfaces 34e', 34e'' (FIGS. 10 to 13), which are at right angles to each other and when the centering projections have been inserted into the aperture 32f said centering surfaces are in contact with engaging edges 32g (FIGS. 8, 9, 14) of the associated slat 32. The design and arrangement of the centering projections 34e provided on the link plates 34c of the chain link 34 are particularly apparent from FIGS. 10 to 12. Each link plate 34c of each chain link 34 comprises a centering projection 34e, which projects from the top of the link plate. The two chain links 34 associated with each slat 32 are provided with detent tongues 34f for forming snap-action joints with said slat 32. Each detent tongue 34f extends through the aperture 32f, which is formed in the planar adjacent end portion 32e of the slat 32. The configuration of the aperture 32f is particularly apparent from FIG. 8. As is particularly apparent from FIG. 9, two detent tongues 34f extend through the aperture 32f and have locking top portions 34f', which engage the top of the slat 32 adjacent to the aperture 32f. The root portion of each of the two detent tongues 34f of each chain link 34 is connected by crosspieces 34g (FIGS. 9, 12, 14) to the adjacent link plate 34c of the chain link 34.

Figure 4:
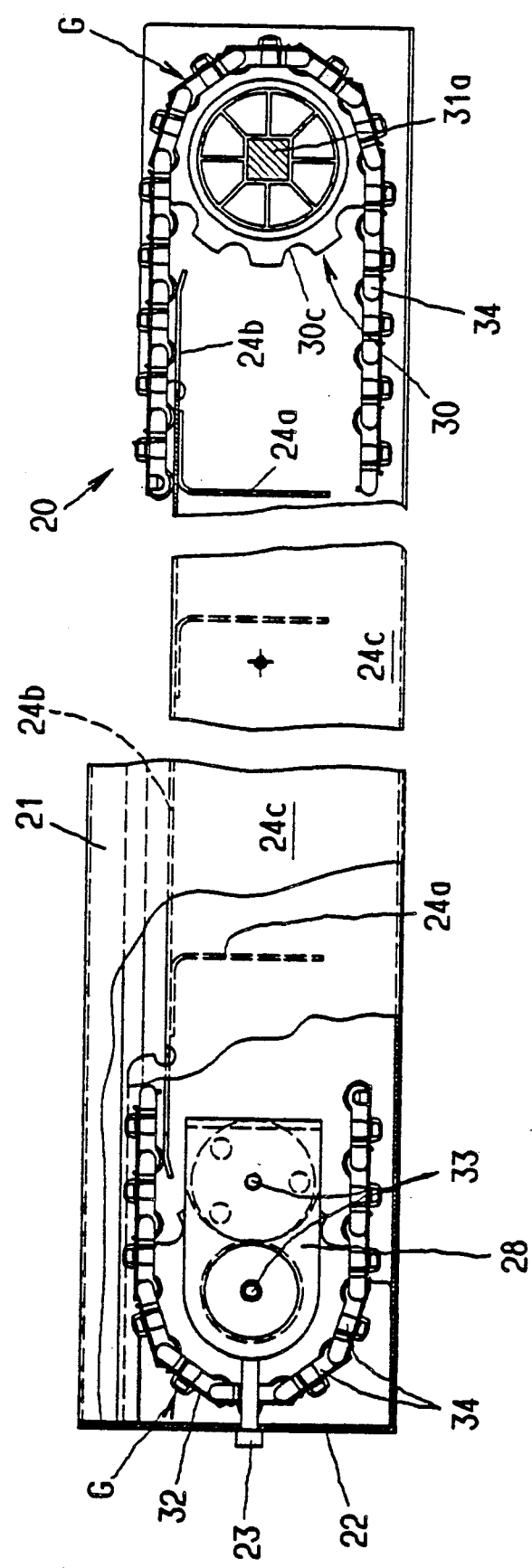
FIG. 4 is a side elevation showing the conveyor of FIG. 1, partly cut away.
Figure 5:
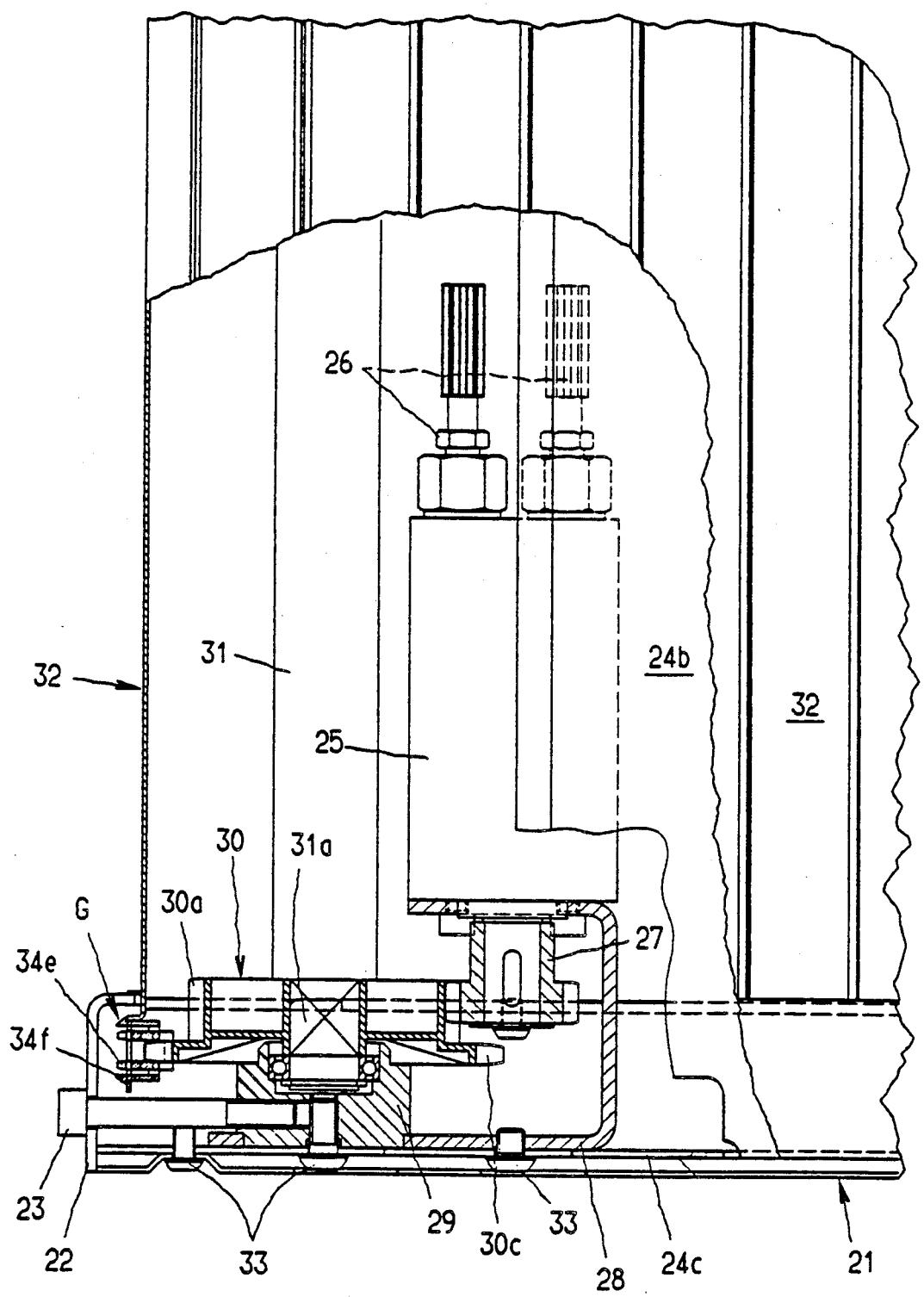
FIG. 5 is an enlarged view showing a portion of FIG. 2.
Figure 6:
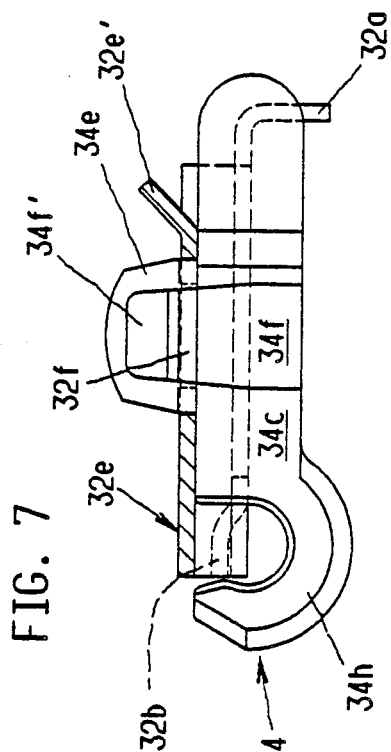
FIGS. 6, 7 and 9 are, respectively, an end elevation, side elevation and top plan view showing a chain link of the link chain of the conveyor and a slat clipped to such chain link.
Figure 7:
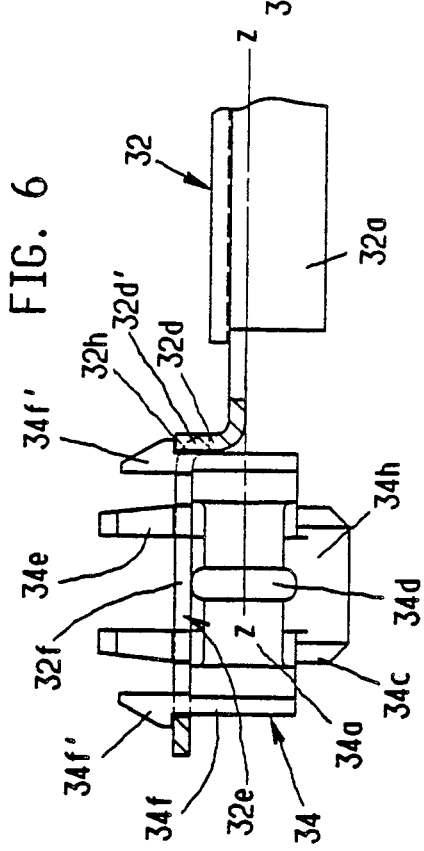

The slats 32 have offset planar end portions 32e', which cover the adjacent chain links 34. The conveyor surface of the conveying belt of the conveyor 20 is constituted by central portions of the slats 32 of the upper course of the conveying belt of the conveyor 20. Said central portions of the slats of said upper course lie approximately in a plane z—z (FIG. 6), which contains the axes of the pivot pins 34a so that the planar end portions 32e covering the pivot pins 34a of the link chain G (FIG. 4) will retain the pivot pins 34a in the pin-mounting portions 34b because each of said end portions 32e is in contact with a restraining ring 34d of the adjacent pivot pin 34a. As is particularly apparent from FIGS. 10 and 12, the restraining ring 34d is constituted by a centrally disposed annular bead of the pivot pin. The locking portion 34f' of the inner detent tongue 34f, which faces the vertical longitudinal plane of symmetry s—s of the conveying belt, engages the top edge 32h of an associated punched lug 32d' of the slat 32. The edge 32h is flush with the planar end portion 32e and has been formed in that the lug 32d' has been severed from the slat 32 on three sides adjacent to the step 32d and has been bent to extend at right angles to the conveying surface. The offset planer end portion 32e' serves to stiffen the planar end portion 32e. The locking portion 34f' of the other, outer latching tongue 34f of each chain link 34 engages the end portion 32e at its top at that end of the aperture 32f which is opposite to the offset planer end portion 32e'.

The design of the frame of the conveyor 20 is particularly apparent from FIGS. 2 to 5. That frame comprises section members 24a (FIG. 4), which extend at right angles to the longitudinal direction of the conveying belt and consist each of an angle section of metal. The frame also comprises planar cover plates 24b, which are connected to the horizontal legs of the section members 24a, also two vertical side plates 24c, which interconnect the section members 24a on both sides. Guard plates 21 extend along the longitudinal sides of the conveyor and cover the link chains G and the chain sprockets 30. Each guard plate 21 is approximately channel-shaped and has a horizontal bottom flange 21a, by which the conveyor 20 is mounted on the carrying bars 11. As is particularly apparent from FIG. 5 the hydraulic rotary drive motor 25 provided with ports 26 is disposed between the top and bottom courses of the conveying belt and is connected by a U-shaped member 28 to the adjacent side plate 24c. The output pinion 27 of the drive motor 25 meshes with a gear 30a of the adjacent chain sprocket 30, which comprises another gear 30c that has a larger radius and meshes with the adjacent link chain G. The two chain sprockets 30 are non-rotatably connected to respective ends of a shaft 31 and are rotatably mounted in bearing housings 29. The bearing housings 29 are supported by fixing screws 33 in the adjacent side plates 24c. The fixing screws 33 are mounted in horizontal longitudinal slots formed in the side plates 24c for adjustment in the direction of travel of the conveyor 20. The adjustment is effected by means of a tensioning screw 23, which is axially supported by a cover 22 at the end of the carrying frame 24 and is screwed into the associated bearing housing. The tensioning screw 23 is a part of a mechanism for tensioning the conveying belt. That tensioning mechanism need not be described in detail because its design and also the design of the carrying frame of the conveyor 20 are known per se from DE No. 34 08 459 C2 and from the corresponding U.S. Pat. No. 4,608,008, the disclosure of which is incorporated herein by reference. All four chain sprockets of the conveyor 20 are identical.

Figure 3:
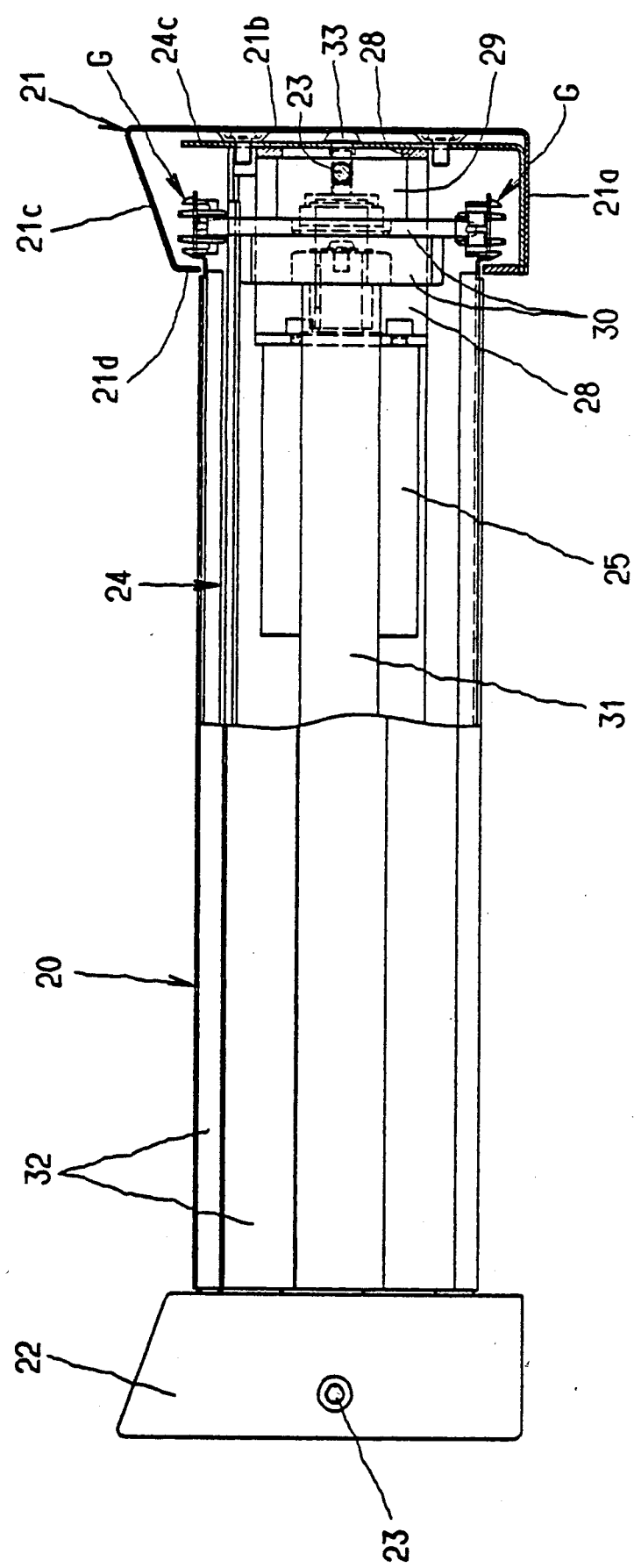

As is particularly apparent from FIG. 3 an inturned top flange 21c, which extends inwardly from the vertical web 21b of the guard plate 21, is formed with a depending vertical edge portion 21d which limits the upward movement of the conveying surface of the conveyor belt and shields the link chain G on the inside. The two shafts 31 have square-section end portions 31a (FIG. 4), to which the chain sprockets 30 are non-rotatably connected. Each slat is formed along one side with a stiffening flange 32a (FIGS. 6, 7), which is bent at right angles. On the opposite side, each slat is slightly upwardly offset to form a covering portion 32b, which overlaps the adjacent slat.

In another embodiment, not shown, the chain links 34 of the link chains may be connected to the slats 32 by screws. In that case the slats and the associated chain links can manually be removed from and inserted into the slat conveyor in that the pivot pins 34a of the chain links are forced out of and into the pin-mounting portions 34b of the respective adjacent chain links by a relative movement which is approximately at right angles to the direction of travel. In a further embodiment the plastic chain links 34 have been injection-molded on the end portions 32e of the slats 32. In that case each of the slat-link assemblies, which consist each of a slat 32 and the two chain links 34, which have been injection-molded on said slat, can be removed from and inserted into the slat conveyor belt as in case of screw-connected parts. In a still further embodiment, link chains made of steel, such as link plate chains, are provided and the slats 32 are connected to the pivot pins of the link chain by means of separate plastic connectors forming snap-action joints, which are formed in that each of said plastic connectors has at one end a latching portion interengaging with a pivot pin of the link chain and at its other end is provided with an elastic detent tongue interengaging with the slat 32. FIGS. 15, 16 and 17 show, respectively, a side elevation, elevation and cross-section view of an embodiment of a plastic connector 100 (two connectors in FIG. 15) joining to a chain link 134 (two links in FIG. 15).

The plastic connector 100 has detent tongues 134f and locking portions 134f' similar to the detent tongues 34f and locking portions 34f' described above. The plastic connector 100 has a latching portion 101 for engaging the chain link 134. The chain links 134 shown in FIG. 15 include a pivot pin 134a and link plates 134c similar to the above-described pivot pin 34a and link plates 34c.

In case of a slack of the chains of the conveyor 20, those portions of the chain links 34 which are in sliding contact will be constituted by the end portions of the centering projections 34e so that the wear of the chain links 34 proper will be reduced in that case.

Instead of sheet metal blanks, the slats may consist of heat-resisting plastic material.

I claim:

1. In an injection molding machine comprising:
   a machine pedestal;
   an injection mold mounted on said machine pedestal and adapted to be opened to permit at least one molding to fall out of said mold into said pedestal, said mold having a vertical projection; and
   a conveyor comprising a reversing pulley device, a motor for driving said reversing pulley device and a conveying belt, said belt having a vertical longitudinal plane of symmetry and being trained around said reversing pulley device, and said belt having an outwardly facing conveying surface, said conveying surface extending in said pedestal below said mold and arranged to receive moldings which have fallen out of said mold,
   the improvement residing in that
   said conveying belt comprising a series of slats, which constitute said conveying surface, said slats produced from a material selected from the group consisting of metal and heat-resisting plastics,
   said reversing pulley device comprising a chain sprocket apparatus,
   said conveyor also comprising first and second link chains, which are trained around and in mesh with said chain sprocket apparatus and extend along said conveying surface on opposite sides thereof and along lines which are approximately symmetrical to said plane of symmetry,
   each of said link chains comprising a series of chain links,
   each of said slats has a first end and an opposite second end, said first end of each slat being connected to one of said chain links of said first link chain and said second end of each slat being connected to one of said chain links of said second link chain to form a slat-link assembly, wherein said slat of each of said slat-link assemblies is detachably connected to the chain links, and wherein each of said slat-link assemblies further comprises two plastic connectors detachably connected to said first and second ends of said slat forming said slat-link assembly and detachably connected to said two chain links forming said slat-link assembly.

2. The improvement set forth in claim 1, wherein said series of slats are connected to said series of chain links of each link chain to form a series of slat-link assemblies, and wherein each of said slat-link assemblies is detachably connected to two adjacent slat-link assemblies in the series of slat-link assemblies.

3. The improvement set forth in claim 2, wherein each of said slat-link assemblies is detachably connected to the two adjacent slat-link assemblies by snap-action joints.

4. The improvement set forth in claim 1, wherein each of said chain links of each of said link chains is detachably connected to two adjacent chain links.

5. The improvement set forth in claim 4, wherein each of said chain links of each of said link chains is detachably connected to the two adjacent chain links by snap-action joints.

6. The improvement set forth in claim 4, wherein said chain links of each of said slat-link assemblies consist of a plastic material, wherein each of said chain links is formed by injection molding each of said chain links on a slat of a slat-link assembly.

7. The improvement set forth in claim 1, wherein each chain link comprises a pivot pin connected to an adjacent chain link in the series of chain links forming one of said link chains by a snap-action joint and connected to one of said plastic connectors of the slat-link assembly composed of said chain link by a snap-action joint.

8. In an injection molding machine comprising:
a machine pedestal;
an injection mold mounted on said machine pedestal and adapted to be opened to permit at least one molding to fall out of said mold into said pedestal, said mold having a vertical projection; and
a conveyor comprising a reversing pulley device, a motor for driving said reversing pulley device and a conveying belt, said belt having a vertical longitudinal plane of symmetry and being trained around said reversing pulley device, and said belt having an outwardly facing conveying surface, said conveying surface extending in said pedestal below said mold and arranged to receive moldings which have fallen out of said mold,
the improvement residing in that
said conveying belt comprising a series of slats, which constitute said conveying surface, said slats produced from a material selected from the group consisting of metal and heat-resisting plastics,
said reversing pulley device comprising a chain sprocket apparatus,
said conveyor also comprising first and second link chains, which are trained around and in mesh with said chain sprocket apparatus and extend along said conveying surface on opposite sides thereof and along lines which are approximately symmetrical to said plane of symmetry,
each of said link chains comprising a series of chain links, each of said slats has a first end and an opposite second end, said first end of each slat being connected to one of said chain links of said first link chain and said second end of each slat being connected to one of said chain links of said second link chain to form a slat-link assembly, wherein said slat and said chain links of each of said slat-link assemblies are detachably connected to each other, and wherein each slat is detachably connected to one of the chain links of the first link chain and detachably connected to one of the chain links of the second link chain by snap-action joints.

9. The improvement set forth in claim 8, wherein each of said snap-action joints is constituted by a first part made of metal and a second part made of plastic.

10. The improvement set forth in claim 9, wherein said first part consists of said slat and said second part consists of one of said chain links.

11. The improvement set forth in claim 10, wherein said chain links are identical and formed with centering projections cooperating with said slats, each chain link having resilient detent tongues forming said snap-action joints with one of said slats.

12. The improvement set forth in claim 8, wherein each chain link comprises a first end, an opposite second end, two mutually opposite link plates, a pivot pin carried by said link plates at the first end, and a pin mounting portion, which is disposed at the second end, said pin mounting portion adapted to be radially received and to be connected to said pivot pin of an adjacent chain link by a snap-action joint.

13. The improvement set forth in claim 12, wherein said link plates comprise link plate end portions which constitute said pin-mounting portion, said link plate end portions formed with substantially semicircular swivel bearings and said link plate end portions being interconnected by a crosspiece, said crosspiece being semicircular in cross-section and adapted to interengage with said chain sprocket apparatus.

14. The improvement set forth in claim 11, wherein each of said slats has a first aperture adjacent to said first end, and a second aperture adjacent to said second end, each of said chain links is provided with a centering projection, said projection of a chain link of said first link chain extending through said first aperture and said projection of a chain link of said second link chain extending through said second aperture, each projection formed with sliding surfaces for sliding engagement with one of said apertures of each slat, each projection formed with centering surfaces which extend at right angles to each other, and each of said apertures is formed with engaging edges engaging said centering surfaces of a centering projection.

15. The improvement set forth in claim 11, wherein each of said slats has a first aperture adjacent to said first end and a second aperture adjacent to said second end, said detent tongues of a chain link of said first link chain extending through said first aperture and said detent tongues of a chain link of said second link chain extending through said second aperture, said detent tongues of each chain link comprising latching portions for forming snap-action joints with an aperture of one of said slats, each of said chain links comprises two link plates, and each of said detent tongues has a root portion, which is connected by at least one crosspiece to one of said link plates of said chain link.

16. The improvement set forth in claim 10, wherein each of said slats is provided at said first and second ends with an offset end portion, each offset end portion extending over one of said link chains, wherein each of said snap action joints comprises a pivot pin and wherein each pivot pin has a restraining ring in contact with an adjacent one of said offset end portions and each of said chain links comprises detent tongues having latching portions for forming snap-action joints with an adjacent one of said slats.

17. The improvement set forth in claim 8, wherein said machine pedestal defines in an interior thereof a delivery compartment, said pedestal formed at one end with an opening adjoining said delivery compartment, and said conveyor detachably connected to said machine pedestal, said conveyor extending through said opening into said delivery compartment and being adapted to be removed as a unit from said machine pedestal.

* * * * *